United States Patent [19]

Spies et al.

[11] Patent Number: 5,627,466

[45] Date of Patent: May 6, 1997

[54] POSITION MEASURING DEVICE HAVING A SENSOR FOR SENSING THE DISTANCE BETWEEN A SCANNING UNIT AND A SCALE

[75] Inventors: Alfons Spies, Seebruck; Josef Müller, Garching, both of Germany

[73] Assignee: Dr. Johannes Heidenhain GmbH, Traunreut, Germany

[21] Appl. No.: 250,369

[22] Filed: May 27, 1994

[30] Foreign Application Priority Data

Jun. 11, 1993 [DE] Germany .......................... 43 19 322.6

[51] Int. Cl.⁶ .............. G01B 7/14; G01B 7/30; G01R 33/09
[52] U.S. Cl. ............. 324/207.21; 324/252; 324/207.12
[58] Field of Search ................ 324/207.21, 207.2, 324/207.23–207.26, 234, 235, 260, 252, 207.12; 360/66, 113, 75; 338/32 R, 32 H

[56] References Cited

U.S. PATENT DOCUMENTS

| 3,918,091 | 11/1975 | Walrauen et al. ............... 360/113 X |
| 4,392,164 | 7/1983 | Lequien . |
| 4,677,377 | 6/1987 | Takahashi et al. ............ 324/207.21 X |
| 4,713,613 | 12/1987 | Takahashi et al. ............ 324/207.21 X |
| 4,727,323 | 2/1988 | Zabler ........................... 324/207.21 |
| 4,766,376 | 8/1988 | Takahashi et al. ............ 324/207.21 |
| 4,944,028 | 7/1990 | Iijima et al. .................... 324/207.21 |
| 5,038,130 | 8/1991 | Eck et al. ....................... 324/207.21 X |
| 5,055,781 | 10/1991 | Sakakibara et al. . |
| 5,079,663 | 1/1992 | Ju et al. ........................... 360/113 |
| 5,172,057 | 12/1992 | Yoshimura et al. ............ 324/207.21 |
| 5,299,143 | 3/1994 | Hellinga et al. . |
| 5,325,056 | 6/1994 | Shonowaki et al. ........... 324/207.21 |
| 5,351,003 | 9/1994 | Bauer et al. .................... 324/207.21 |

FOREIGN PATENT DOCUMENTS

| 0032324 | 7/1981 | European Pat. Off. . |
| 0151002 | 1/1985 | European Pat. Off. . |
| 0478394 | 4/1992 | European Pat. Off. . |
| 4014885 | 11/1990 | Germany . |
| 3941473 | 6/1991 | Germany . |
| 4208927 | 9/1992 | Germany . |

*Primary Examiner*—Sandra L. O'Shea
*Assistant Examiner*—Roger Phillips
*Attorney, Agent, or Firm*—Brinks Hofer Gilson & Lione

[57] ABSTRACT

A position measuring device having a sensor, the output signal Sd of which is a function of the distance between a graduation and a scanning unit. To render the distance-dependent signal independent of temperature changes, the sensor consists of a potentiometer circuit with an active branch and a complementary branch. Magneto-resistive elements which scan the graduation are disposed in the active branch. Resistive elements are disposed in the complementary branch which have the same temperature behavior as the magneto-resistive elements of the active branch, but are substantially insensitive to magnetic fields. The voltage across the active branch is taken as the distance-dependent measuring signal Sd and is used to control the amplitude of the position-dependent scanning signals generated by scanning the graduation.

23 Claims, 9 Drawing Sheets

POSITION MEASURING DEVICE HAVING A SENSOR FOR SENSING THE DISTANCE BETWEEN A SCANNING UNIT AND A SCALE

FIELD OF THE INVENTION

The invention relates to a position measuring device for measuring the relative position of two objects which are movable relative to each other wherein a graduation of a scale is scanned by a scanning unit having a plurality of magneto-resistive elements for generating position-dependent scanning signals and a sensor for determining the distance between the graduation and the scanning unit.

BACKGROUND OF THE INVENTION

Position measuring devices for measuring the relative position of two objects are used particularly in connection with processing machines for measuring the relative position of a tool with respect to a workpiece which is to be processed.

European Patent Publication EP 0 151 002 B1 discloses a magnetic position measuring device for measuring the relative position of two objects. In particular, a periodic graduation is scanned by a scanning unit having two groups of magneto-resistive elements, each group having four magneto-resistive elements for generating zero-symmetrical output signals. The four magneto-resistive elements of the two groups which have output signals with phase positions of 0° and 180° are connected in series to form a first half-bridge circuit. The magneto-resistive elements of the two groups which have output signals with phase positions of 90° and 270° are connected in series to form a second half-bridge circuit. Two zero-symmetrical output signals with a mutual phase offset of 90° are present at the center pick-ups of the two half-bridge circuits to obtain measured position values in a downstream-connected evaluation device.

In measuring devices of this type, the signal amplitude of the output signals is heavily dependent on the distance between the graduation and the scanning unit. Changes in the distance between the scanning unit and the graduation cause changes in the amplitude of the output signals which makes subsequent interpolation of the output signals more difficult.

SUMMARY OF THE INVENTION

According to a first aspect of the invention, there is provided a position measuring device for measuring the relative position of a first object with respect to a second object. A scale having a periodic graduation in the form of a magnetized pattern is located on the first object. A scanning unit located on the second object for scanning the graduation located on the first object includes a plurality of magneto-resistive elements exposed to the graduation to generate position-dependent scanning signals. A sensor is also included in the scanning unit to detect the distance between the scanning unit and the graduation and generate a correction signal dependent upon the distance detected.

According to a second aspect of the invention, a scanning unit is provided for scanning a magnetized periodic pattern. The scanning unit includes a plurality of magneto-resistive elements disposed opposite to the periodic pattern to generate position-dependent signals. In addition, means are provided for detecting the distance between the scanning unit and the periodic pattern and generating a correction signal dependent upon the distance detected.

According to a third aspect of the invention, a method for measuring the relative position of a first object with respect to a second object is provided. The method includes providing a scale on the first object having a periodic graduation in the form of a magnetized pattern. The scale is scanned with a scanning unit located on the second object. Position-dependent scanning signals are generated by a plurality of magneto-resistive elements provided on the scanning unit. A correction signal is generated using a sensor provided on the scanning unit the correction signal being dependent upon the distance between the scanning unit and the graduation. The position-dependent scanning signal is then corrected with the correction signal.

It is an object of the present invention to create, simply, a distance-dependent controlled variable in a position measuring device to adjust the amplitude of the output signals.

An advantage of the present invention is that by using a simple sensor arrangement, a measuring signal which is not modulated by the graduation is generated, the signal amplitude of which is a function of the distance between the scanning unit and the graduation. A simple regulation of the signal amplitude of the position-dependent output signals of the position measuring device is thus made possible by means of this measuring signal.

The invention itself, together with objects and attendant advantages, will best be understood by reference to the following detailed description taken in conjunction with accompanying drawings. It should be understood, however, that this description is to be illustrative rather than limiting, the scope of the invention being defined by the appended claims and equivalents thereof.

BRIEF DESCRIPTION OF THE DRAWINGS

FIG. 5b is a circuit illustration of the sensor arrangement shown in FIG. 5a.

FIG. 9b is a circuit illustration of the position measuring device shown in FIG. 9a.

DETAILED DESCRIPTION OF THE PRESENTLY PREFERRED EMBODIMENTS

Figure 1:
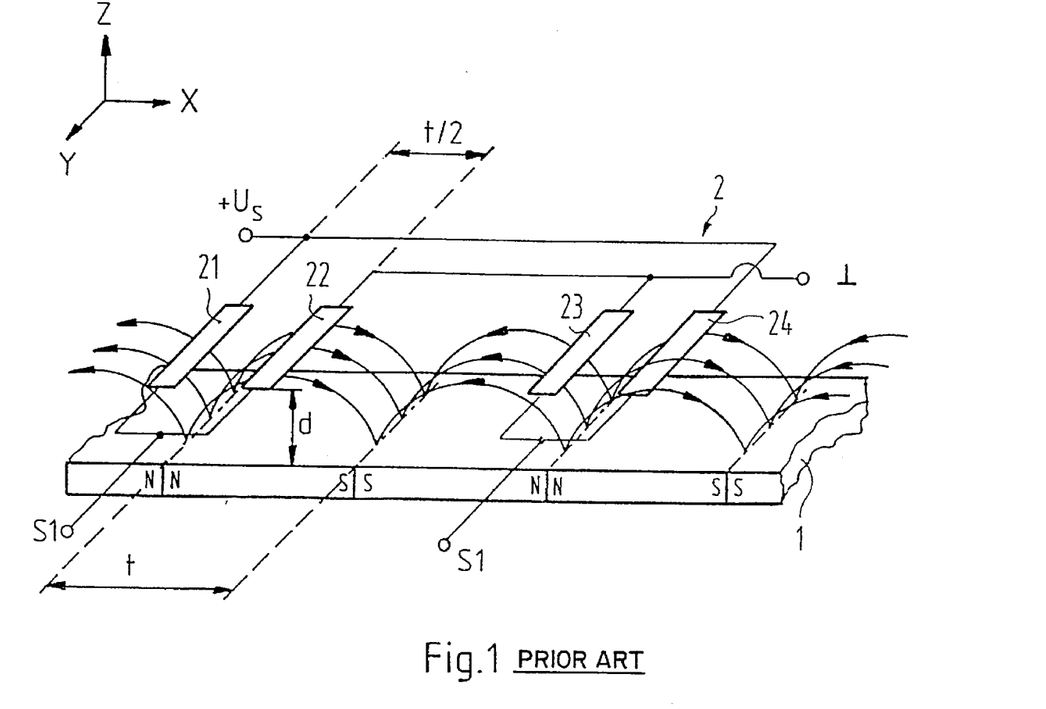
FIG. 1 is a perspective view of a known position measuring device.

FIG. 1 illustrates a known linear measuring device. The device includes a scale having a graduation 1 and a scanning unit 2. The scale is formed of a magnetizable material and the graduation 1 is formed by magnetizing a periodic pattern on the scale. In a preferred embodiment the graduation consists of magnetized areas N and S which follow each other in sequence in the measuring direction X. The N and S areas are magnetized with opposite polarity and are arranged so that the N pole of one area abuts the N pole of the adjacent area and the S pole of an area abuts the S pole of an adjacent area as illustrated. The graduation 1 has a graduation period t which is defined by the pole distance between the N and S poles.

The scanning unit 2 includes a plurality of magneto-resistive elements 21, 22, 23 and 24. The graduation 1 is scanned in the X-direction by the magneto-resistive elements 21, 22, 23 and 24 of the scanning unit 2. Position-dependent or scanning output signals are then generated from the magneto-resistive elements as will be described. In a preferred embodiment, the magneto-resistive elements 21, 22, 23 and 24 are made of permalloy which has an electrical resistance that varies as a function of the strength of the magnetic field of the graduation 1. The change in resistance is approximately 2%.

Figure 2:
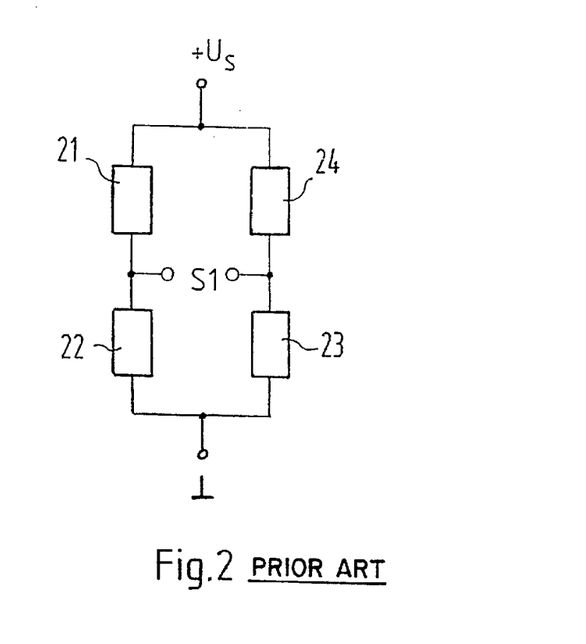
FIG. 2 is a circuit illustration of the position measuring device shown in FIG. 1.

Because of this relatively small change in resistance and in order to compensate for signal drift caused by temperature-generated changes in resistance, the plurality of elements 21, 22, 23 and 24 are connected together to form a Wheatstone bridge as shown in FIG. 2. In such a configuration, oppositely located elements have respective phase differences of half a graduation period t or 180°.

As previously described, position measuring devices of this type have been used in connection with processing machines for measuring the relative position of a tool with respect to a workpiece which is to be processed. In such an application, the graduation 1 is preferably fixed to the bed of a machine tool (not shown) or a guide (not shown), for example, or it may be directly applied thereto. The scanning unit 2 is located on a carriage (not shown) which can be moved in the X-direction relative to the graduation.

In the course of the relative movement of these two objects, the scanning unit 2 slides on the graduation 1 or on the support for the graduation 1. However, because of wear of the sliding elements or other effects, the distance d between the graduation 1 and the scanning unit 2 changes in actual use. A change of the distance d in the Z-direction causes either a reduction or increase in resistance of the magneto-resistive elements 21, 22, 23 and 24 during the scanning of graduation 1 in the X-direction. This change in resistance causes a change in the signal amplitude of the position-dependent scanning output signals.

Figure 3A:
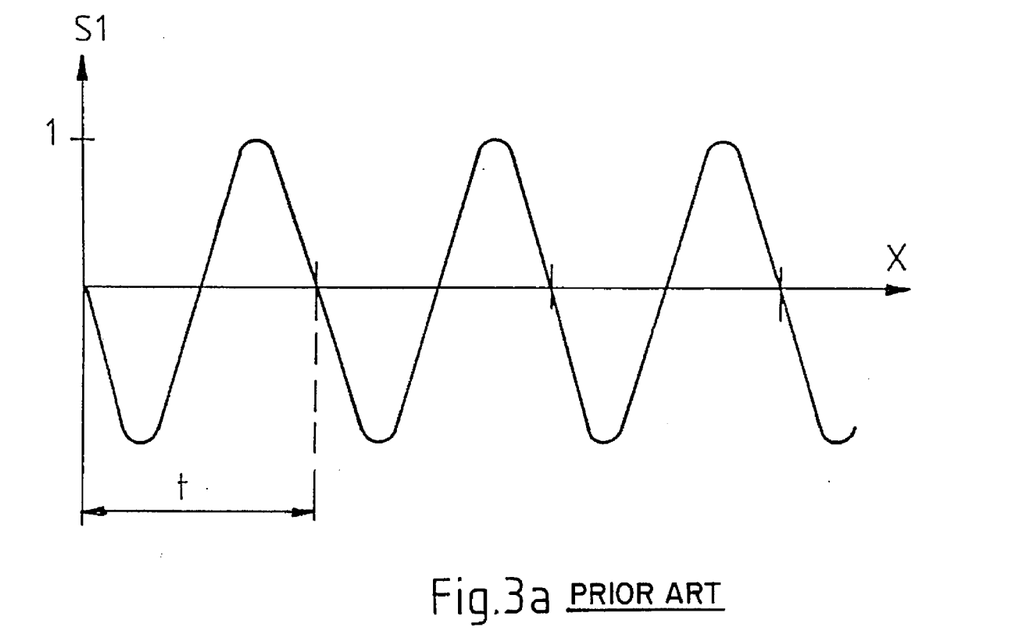
FIGS. 3a and 3b show a scanning signal generated at different scanning distances.
Figure 3B:
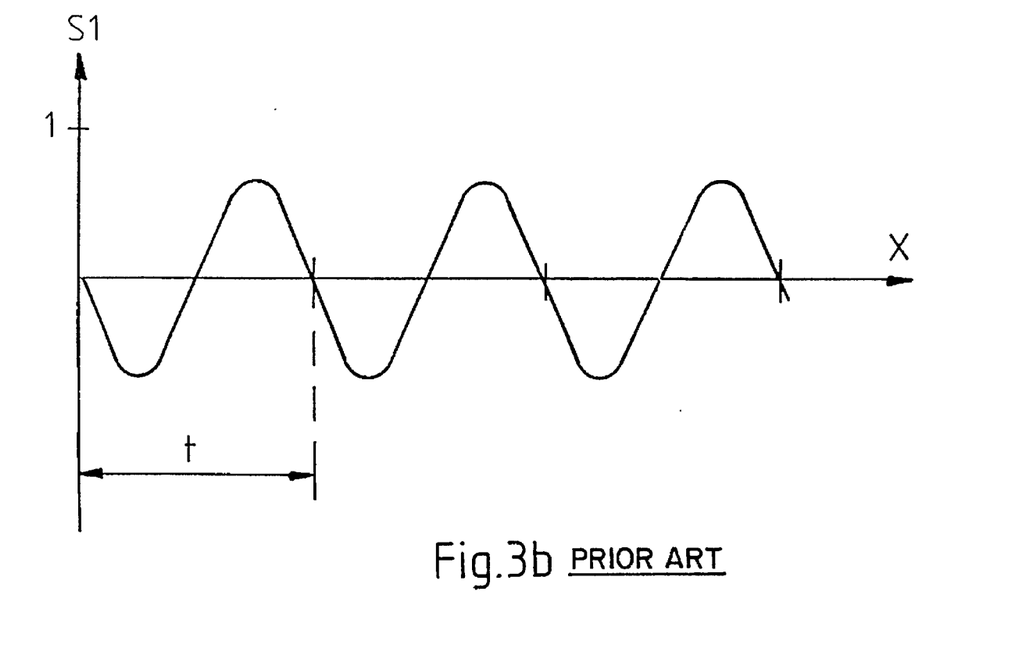

FIG. 3a illustrates a scanning signal S1 generated under optimal conditions where the distance d the graduation 1 and the scanning unit 2 is constant. FIG. 3b illustrates a scanning signal S1 when the distance d between the graduation 1 and scanning unit 2 is increased from the optimal condition. When the distance d is increased, the signal amplitude is reduced as illustrated.

In order to reduce the effects on signal amplitude such changes in distance have, an analog, temperature-compensated and interference field-independent controlled variable is required for controlling the signal amplitude. In a preferred embodiment of the present invention, a sensor 3 is used, which outputs a measuring or correction signal Sd which is as unmodulated as possible by the graduation 1 and the signal amplitude of which is a function of the distance d between the scanning unit 2 and the graduation 1.

Figure 4:
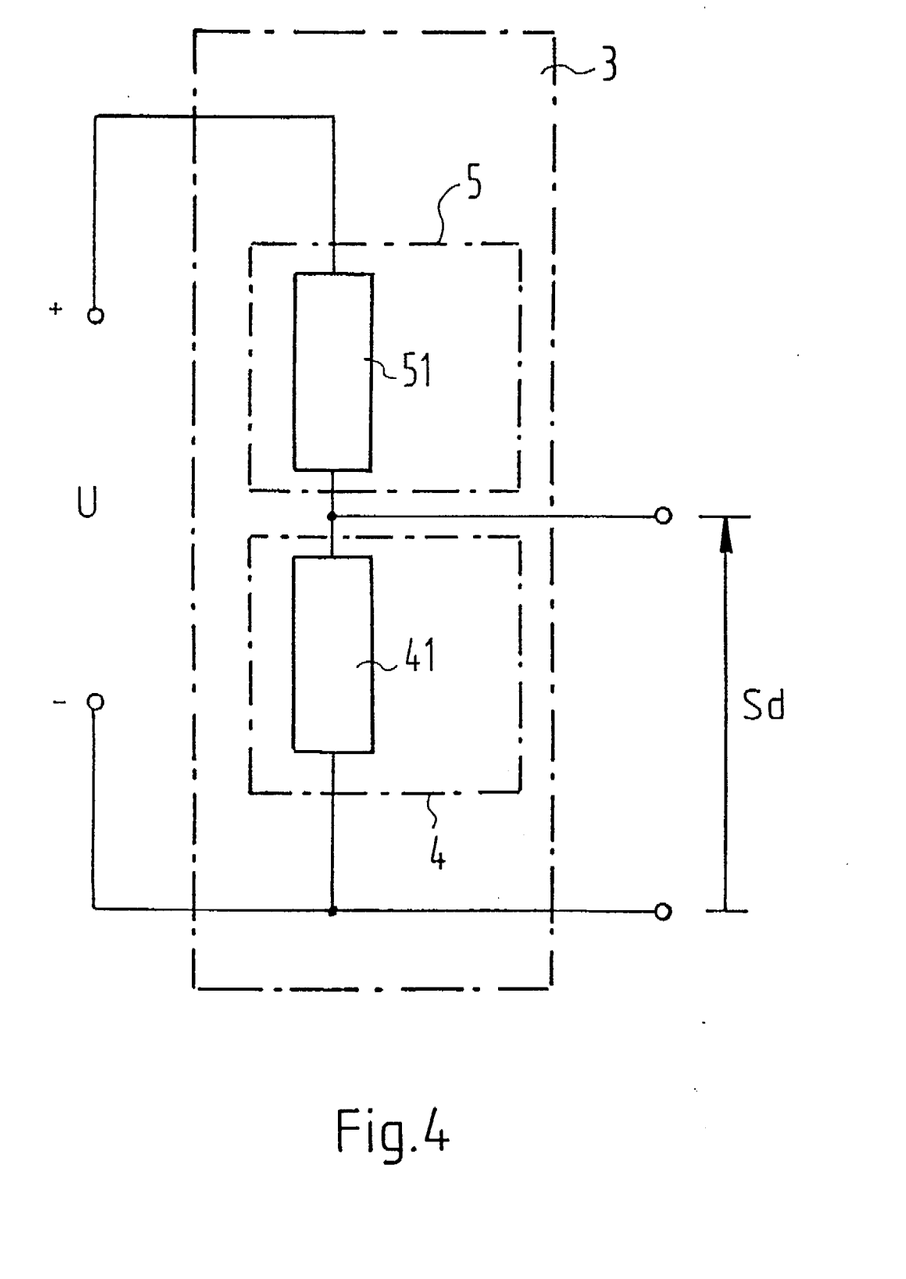
FIG. 4 illustrates a sensor arrangement according to a first preferred embodiment of the present invention.

FIG. 4 illustrates a sensor arrangement according to a first preferred embodiment of the present invention. In this embodiment, the sensor 3 is in the form of a potentiometer circuit. A magneto-resistive element 41 is disposed in an active branch 4 of the potentiometer circuit. The resistance of element 41 changes as a function of the distance d between the scanning unit 2 and graduation 1. A complementary branch 5 of the potentiometer circuit has a resistor 51. The resistance of resistor 51 is independent of the distance d between the scanning unit 2 and graduation 1. The voltage across the active branch 4 of the potentiometer circuit is picked up as the distance-dependent measuring or correction signal Sd.

Figure 5A:
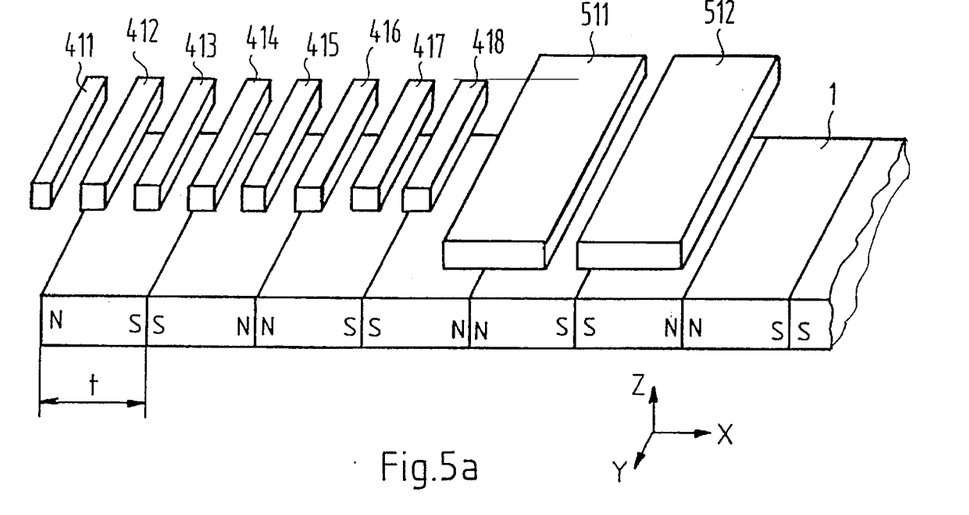
FIG. 5a illustrates a sensor arrangement used to scan a periodic graduation according to a second preferred embodiment.

FIG. 5a illustrates a sensor arrangement used to scan a periodic graduation according to a second preferred embodiment. The active branch of the sensor includes a plurality of magneto-resistive elements 411–418 arranged opposite the graduation. The arrangement has been selected such that the resultant measuring signal Sd remains substantially unmodulated by the graduation. The complementary branch preferably includes magneto-resistive elements 511 and 512 which are disposed with their sensitive long axis in the Y-direction as are the axes of elements 411–418. The elements 511 and 512 are of such a size that their resistance is substantially independent of the distance d between the scanning unit and the scale. In particular, elements 511 and 512 are made especially wide. In a preferred embodiments, with a graduation period t of 200 µm; elements 411–418 have a thickness of about 100 nm, a width of about 25 µm and a length of about 1.5 mm. Elements 511 and 512 have a thickness of about 100 nm, a width of about 200 µm and a length of about 3 mm.

Figure 5B:
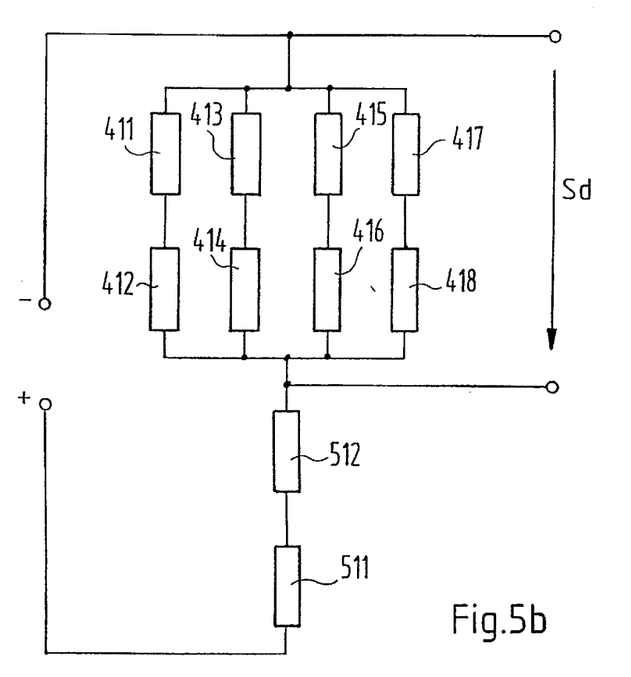

With such dimensions, elements 511 and 512 have a higher sensitivity compared with the sensitivity of the elements 411–418 and are therefore magnetically saturated in the operative range. The operative range is defined by the distance d occurring during scanning. In the example described, the total resistance of the active branch 4 equals the total resistance of the complementary branch 5. Elements 411–418 and 511, 512 are made of the same permalloy material, therefore temperature changes have no effect on the measuring or correction signal Sd. FIG. 5b is a circuit illustration of the sensor arrangement shown in FIG. 5a.

Figure 6:
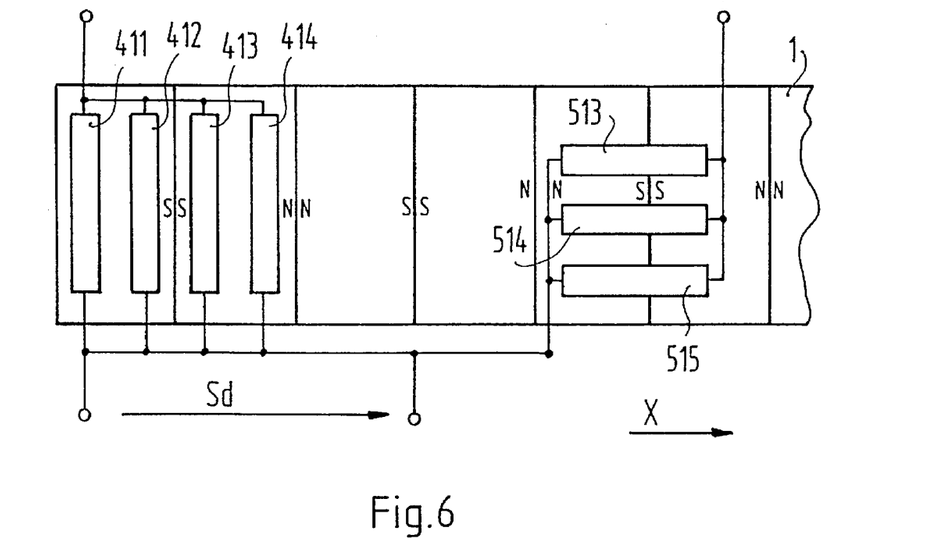
FIG. 6 illustrates a sensor arrangement according to a third preferred embodiment.

FIG. 6 illustrates a sensor arrangement according to a third preferred embodiment. The magneto-resistive elements 411–414 of the active branch are arranged in such a way that several of them scan one graduation period t of the graduation 1 simultaneously as illustrated. All the magneto-resistive elements 411–414 are connected in parallel so that the measuring signal Sd is substantially unmodulated by the graduation 1. The magneto-resistive elements 513–515 of the complementary branch are arranged in such a way that changes in field strength that may occur during scanning of the graduation 1 do not cause changes in resistance of elements 513–515. In particular, the long axes of elements 513–515 extend in the measuring direction X, i.e. the magnetically insensitive direction.

To avoid or reduce distance-dependent resistance changes in the complementary branch, it is also possible to spatially separate the magneto-resistive elements of the complementary branch from the graduation, for example, by positioning the complementary branch at the back of the support. With incremental position measuring systems it is possible to position the magneto-resistive elements of the complementary branch between an incremental track and a reference mark track. In absolute position measuring systems having a plurality of tracks, positioning the complementary branch between two tracks is also possible. Alternatively, it is also possible to encapsulate the magneto-resistive elements of the complementary branch in a magnetically insulated manner so that the magnetic fields have no effect on the magneto-resistive elements of the complementary branch.

Figure 7:
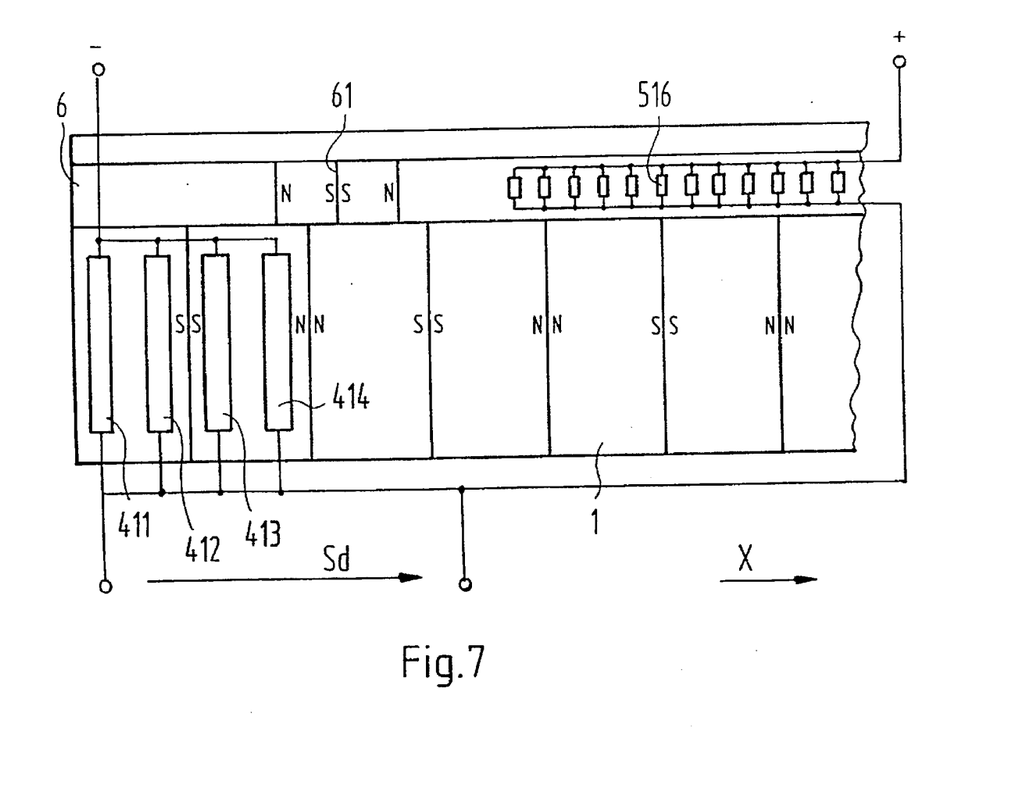
FIG. 7 illustrates a sensor arrangement according to a fourth preferred embodiment.

FIG. 7 illustrates a sensor arrangement according to a fourth preferred embodiment. The magneto-resistive elements 411–414 of the active branch are positioned over or opposite to the graduation in the same manner as previously shown in FIG. 6. The magneto-resistive elements 516 of the complementary branch are not positioned directly over or opposite to the graduation 1. Instead, they are positioned opposite of a reference mark track 6 to scan track 6. The plurality of magneto-resistive elements 516 of the complementary branch are spaced apart from one another in the measuring direction X and are connected in parallel to each other. By positioning the elements 516 of the complementary branch so that they span over the reference marks 61 of the reference track 6, the magnetic field strength of the reference mark 61 acts only on a few elements 516 at a time to cause a change of resistance in those elements. Because of the parallel connection of the elements 516, this resistance change has little effect, if any, on the total resistance of the complementary branch.

Alternatively, it is also possible that the arrangement of the magneto-resistive elements 513–514 of the complementary branch shown in FIG. 6 be positioned opposite a reference mark track 6 for scanning.

Figure 8:
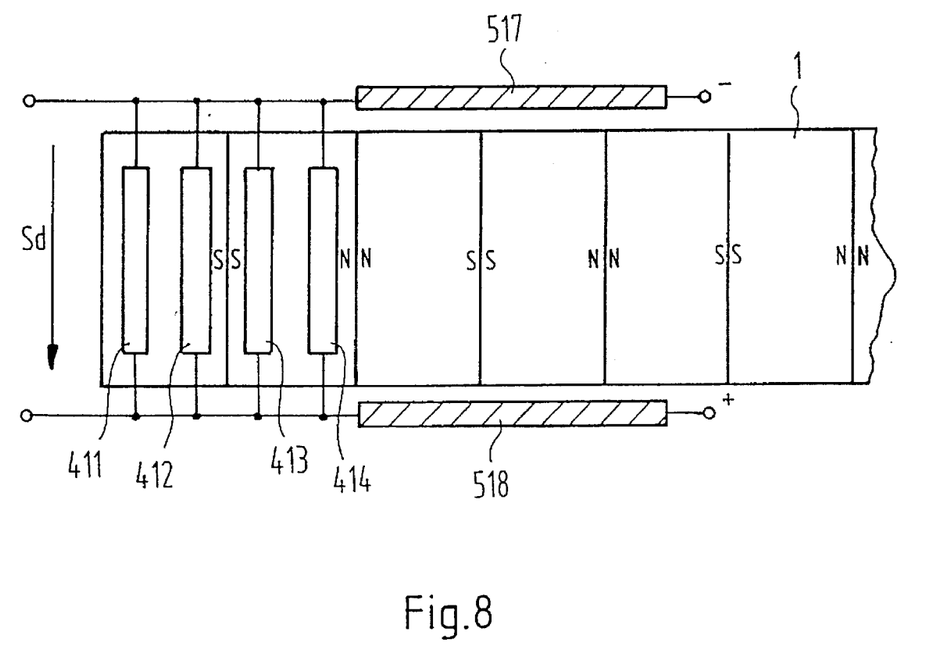
FIG. 8 illustrates a sensor arrangement according to a fifth preferred embodiment.

It is also possible to employ other resistive elements in place of the magneto-resistive elements 511–516 shown in the complementary branch 5. These elements should display an equal temperature behavior as the elements 411–418 of the active branch 4, but exhibit little or no magnetic sensitivity. Equal temperature behavior means that the resistance of the active branch and complementary branch change in the same way in response to changes in temperature. Copper, for example, is suitable as such a material. FIG. 8 illustrates a sensor arrangement according to a fifth preferred embodiment. The complementary branch 5 is embodied in high-impedance lines 517 and 518 which are preferably formed of copper. These lines are placed on the same support as elements 411–414.

The preferred embodiments of the sensor 3 previously described require one or several magneto-resistive elements 411–418 in the active branch 4. These elements 411–418 are required in addition to the magneto-resistive elements 21–24 used to generate position-dependent scanning signals.

Figure 9A:
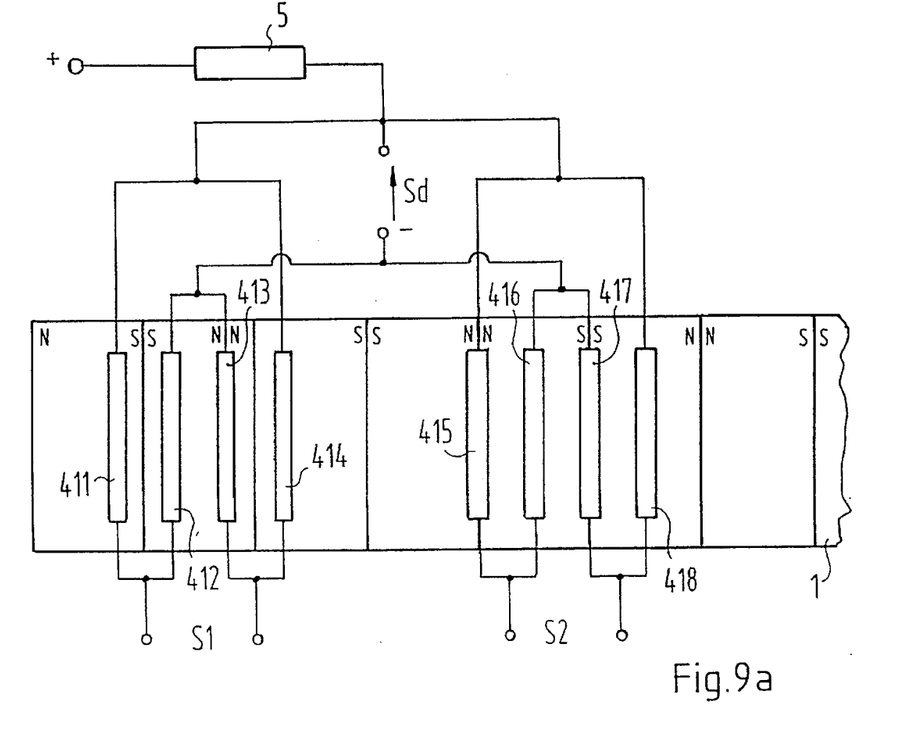
FIG. 9a illustrates a position measuring system according to a sixth preferred embodiment.
Figure 9B:
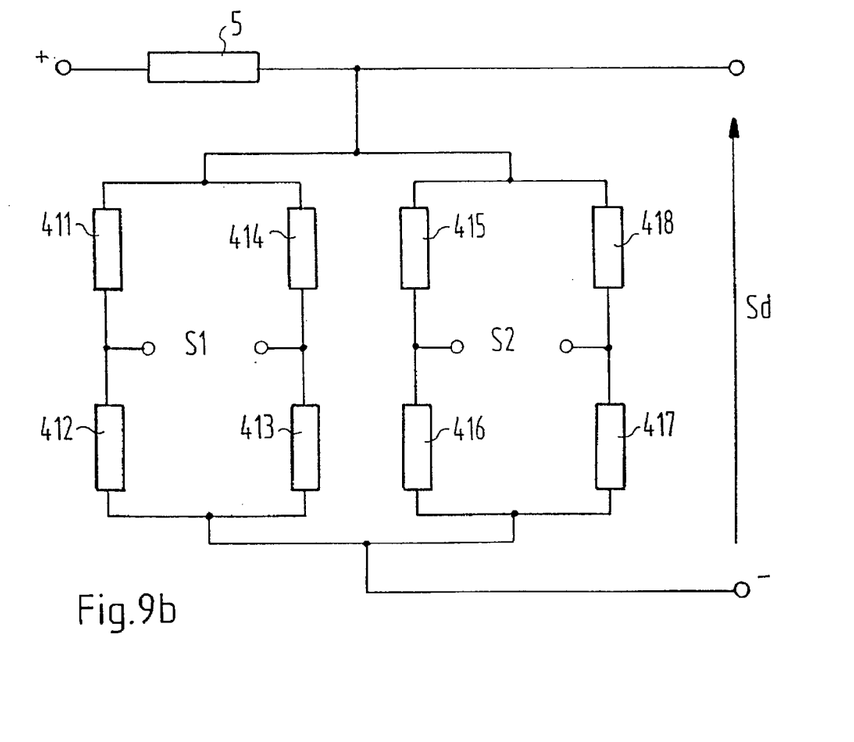

FIG. 9a illustrates a position measuring system according to a sixth preferred embodiment. The magneto-resistive elements 411–418 which form the active branch of the sensor also generate position-dependent measurement signals.

The magneto-resistive elements 411–414 are positioned over or opposite of the graduation 1 to scan the graduation 1. They are electrically connected to form a full bridge circuit. The amplitude of the sinusoidal scanning signal S1 present at the output of the bridge circuit defines the position of the scanning unit 2 with relation to the graduation 1 in the measuring direction X. An arrangement of this type had already been described with reference to FIGS. 1 and 2. With incremental position measuring devices it is also necessary to detect the direction of movement of the scanning unit with respect to the graduation. Thus, a second full bridge with the magneto-resistive elements 415–418 is provided. The second full bridge circuit generates a scanning signal S2 which is phase-shifted with respect to scanning signal S1 by 90°. Both full bridge circuits are connected in parallel on the voltage side and the sensor is completed by means of a complementary branch 5 already described in the previous examples. The distance-dependent signal Sd is picked up across the parallel circuit of the two full bridge circuits. In order to obtain a measuring signal Sd which is especially free of harmonics, it is also possible to connect several full bridge circuits together, wherein each individual full bridge circuit generates a scanning signal which is phase-shifted with respect to the scanning signals generated by the other full bridge circuits and position-dependent with relation to the measuring direction X.

Figure 10:
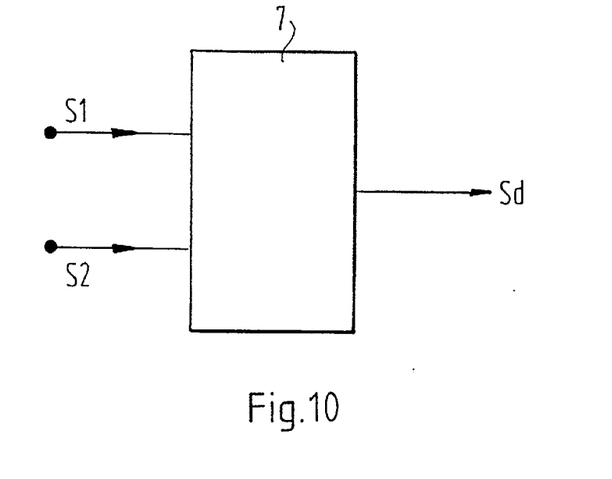
FIG. 10 illustrates a sensor arrangement according to a seventh preferred embodiment.

A further possibility of generating a distance-dependent measuring signal Sd is illustrated in FIG. 10. The position-dependent, sinusoidal scanning signals S1 and S2, generated by the position measuring device, are supplied to a rectifier circuit 7 of the sensor 3. Here, too, the measuring signal Sd is particularly free of harmonics if several scanning signals S1, S2 are rectified.

Figure 11:
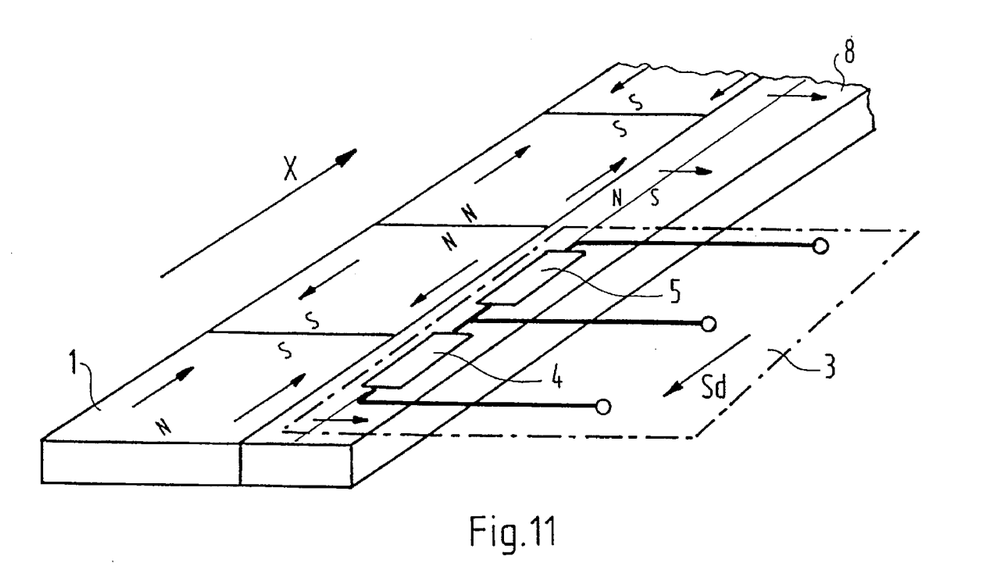
FIG. 11 illustrates a sensor arrangement according to an eighth preferred embodiment.

FIG. 11 illustrates a sensor arrangement according to an eighth embodiment. A magnetic auxiliary track 8 is provided parallel to the graduation 1, the pole direction of which extends crosswise to the measuring direction X as illustrated. The sensor 3 again includes an active branch 4 formed by one or several magneto-resistive elements. These elements are embodied and arranged in such a way that they scan the magnetic field of the auxiliary track 8 and that a distance-dependent signal Sd is present at the output. The sensor 3 is also complemented here by a complementary branch 5 with a total resistance which is independent of the magnetic fields of the graduation and the auxiliary track. The complementary branch 5 can be embodied in accordance with any of the previously described embodiments. The elements of the complementary branch scan the auxiliary track 8, as indicated, however, they may alternatively scan graduation 1.

The described sensor arrangements in the form of potentiometer circuits have the great advantage that temperature changes do not cause changes in the measuring signal Sd. If, however, changes in the measuring signal Sd based on temperature changes are tolerated or permittable, it is possible to omit the complementary branch in the described arrangements and the active branch can be supplied with constant current. The voltage across the active branch constitutes the distance-dependent measuring signal Sd.

Figure 12A:
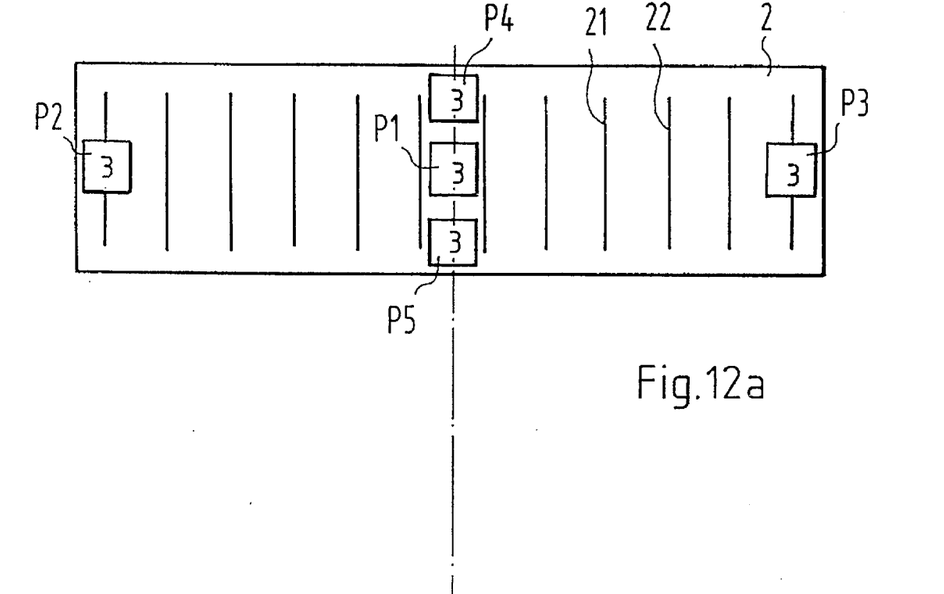
FIGS. 12a and 12b show advantageous positions of the sensor on a scanning device.
Figure 12B:
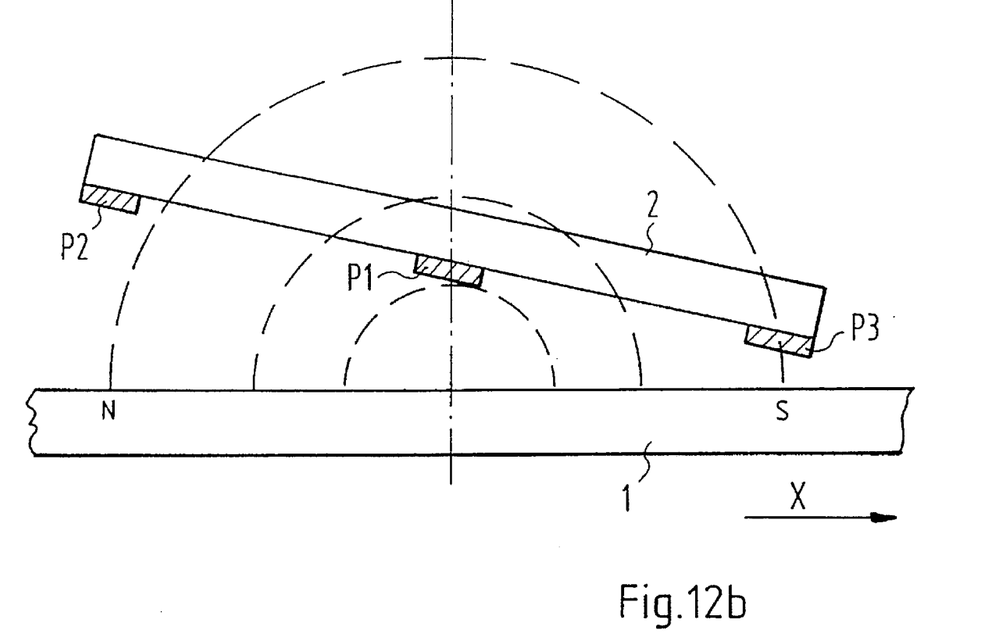

FIGS. 12a and 12b show at which positions P the sensor 3 is advantageously arranged on the scanning unit 2 with relation to the magneto-resistive elements 21 and 22 of the position measuring device. Only two of the elements 21 and 22 are indicated for the sake of simplifying the representation. If the sensor 3 is disposed at position P1, a correct scanning signal Sd indicating the mean distance d is obtained even if the scanning unit 2 is tilted. A correct measuring signal Sd is also received if the individual magneto-resistive elements of the active branch of the sensor 3 are partially placed at position P2 and P3, or P2, P3 and P4, P5. Thus, a correct measuring signal Sd defining the mean distance d is received when the center of the area of the elements forming the active branch 4 coincides with the center of the area of the magneto-resistive elements 21 to 24.

The distance-dependent measuring signal Sd is used particularly advantageously for controlling or correcting the scanning signals S1 and S2 output by the position measuring device. This can take place via an amplifier, for example, which either amplifies the signal amplitude of the scanning signals S1 and S2 as a function of the distance-dependent measuring signal Sd. Alternatively, the voltage supplied to the magneto-resistive elements 21 to 24 is varied as a function of the distance-dependent measuring signal Sd.

Another advantageous option for control or correction includes varying the distance d between the scanning unit 2 and the graduation 1 as a function of the measuring signal Sd. This can be performed by connecting the scanning unit with a drive unit which moves the scanning unit in the Z-direction. The drive unit can be a coil arrangement or a piezo element as already known from European Patent Publication EP 0 242 492 A1.

As previously described, the measuring signal Sd of the sensor indicates the distance between the scanning unit 2 and the graduation 1. In this way a two-coordinate system is created whereby simultaneous measurement in the X and Z directions is made possible.

The invention can be employed with incremental as well as absolute linear and/or angular measuring devices.

While this invention has been shown and described in connection with the preferred embodiments, it is apparent that certain changes and modifications, in addition to those mentioned above, may be made from the basic features of the present invention. Accordingly, it is the intention of the Applicants to protect all variations and modifications within the true spirit and valid scope of the present invention.

What is claimed is:

1. A position measuring device for measuring the relative position of a first object with respect to a second object, comprising:
    a scale located on the first object having a periodic graduation in the form of a magnetized pattern;
    a scanning unit located on the second object for scanning the graduation located on the first object;
    a plurality of magneto-resistive elements disposed on the scanning unit, wherein the elements are exposed to the periodic graduation to generate position-dependent scanning signals wherein the scanning signals are dependent on the instantaneous position of the scale in the measurement direction; and
    a sensor disposed on the scanning unit, wherein the sensor detects the distance between the scanning unit and the graduation and generates a correction signal dependent upon the distance detected wherein the sensor includes said plurality magnetoresistive elements placed directly opposite of the periodic graduation for scanning this periodic graduation wherein the magnetoresistive elements of the sensor are distributed three-dimensionally relative to the scale and are electrically wired together so that a largely unmodulated correction signal appears at the output of the sensor unit.

2. A position measuring device according to claim 1 wherein the sensor is formed by a potentiometer circuit comprising:
    an active branch having at least one magneto-resistive element the resistance of which changes as a function of the distance between the scanning unit and the graduation; and
    a complementary branch connected in series with the active branch, the complementary branch having at least one resistive element the resistance of which is substantially insensitive to the distance between the scanning unit and the graduation,
    wherein the correction signal is obtained across the active branch.

3. A position measuring device according to claim 2 wherein the complementary branch of the sensor is formed by a plurality of magneto-resistive elements.

4. A position measuring device according to claim 3 wherein the magneto-resistive elements of the complementary branch are positioned on the scanning unit to scan the graduation and the dimensions of these magneto-resistive elements are such that their resistance does not change as a function of their distance from the graduation.

5. A position measuring device according to claim 3 wherein the magneto-resistive elements of the complementary branch are positioned on the scanning unit to scan the graduation and the arrangement of those magneto-resistive elements is such that their resistance does not change as a function of their distance from the graduation.

6. A position measuring device according to claim 5 wherein each magneto-resistive element of the complementary branch has a long axis which extends in the measuring direction.

7. A position measuring device according to claim 3 wherein the magneto-resistive elements of the complementary branch are positioned on the scanning unit so as not to be exposed to the graduation during scanning.

8. A position measuring device according to claim 3 wherein the distance between the scanning unit and graduation may vary within an operative range during scanning and the magneto-resistive elements of the complementary branch are magnetically saturated in this operative range.

9. A position measuring device according to claim 3 further comprising a reference mark track next to the graduation wherein the magneto-resistive elements of the complementary branch are positioned to scan the reference mark track.

10. A position measuring device according to claim 2 wherein the at least one resistive element of the complementary branch is formed of a material which has the same temperature behavior as the at least one magneto-resistive element of the active branch.

11. A position measuring device according to claim 2 wherein the at least one resistance element of the complementary branch is formed by a high impedance line.

12. A position measuring device according to claim 1 wherein the disposition of the sensor and plurality of magneto-resistive elements used to generate position-dependent signals on the scanning unit is such that the sensor is centrally located.

13. A position measuring device according to claim 1 wherein the correction signal generated by the sensor is used to control the amplitude of the position-dependent scanning signal.

14. A position measuring device according to claim 1 wherein the correction signal generated by the sensor is supplied to a drive unit which controls the distance between the scanning unit and the graduation.

15. A position measuring device according to claim 1 wherein the sensor comprises a rectifier circuit having an input for receiving at least one position-dependent scanning signal.

16. A position measuring device according to claim 1 wherein the plurality of magneto-resistive elements includes a plurality of magneto-resistive elements connected to form a parallel circuit and the correction signal is taken at the output of the parallel circuit, wherein the magneto-resistive elements for detecting the spacing span one division period of the graduation of the scale.

17. A position measuring device according to claim 16 wherein the position-dependent scanning signals are supplied to a rectifier circuit and the correction signal is present at the output of the rectifier circuit.

18. A position measuring device according to claim 1 wherein the sensor is formed by the same magnetoresistive elements used to generate the position dependent signals.

19. A method for measuring the relative position of a first object with respect to a second object, comprising the steps of:

providing a scale on the first object, the scale having a periodic graduation in the form of a magnetized pattern;

providing a scanner unit on the second object for scanning the scale;

providing a sensor disposed on the scanning unit, wherein the sensor detects the distance between the scanning unit and the graduation and generates a correction signal dependent upon the distance detected, wherein the sensor is formed by a plurality of magnetoresistive elements which are placed directly opposite the periodic graduation and scan the periodic graduation wherein the magnetoresistive elements of the sensor are distributed three-dimensionally relative to the scale and are electrically wired together so that a largely unmodulated correction signal appears at the output of the sensor unit;

scanning the scale with the scanning unit;

generating position-dependent scanning signals using the plurality of magnetoresistive elements provided on the scanning unit, wherein the scanning signals are dependent on the instantaneous position of the scale in the measurement direction;

generating the correction signal using a sensor formed by the magnetoresistive elements, the correction signal being dependent upon the distance between the scanning unit and the scale; and correcting the position-dependent scanning signal with the correction signal.

20. A method according to claim 19 wherein the step of correcting the position-dependent scanning signals includes amplifying the position-dependent scanning signals by an amount dependent upon correction signal.

21. A method for measuring according to claim 19 wherein the sensor is formed by the same magnetoresistive elements used to generate the position dependent signals.

22. A position measuring device for measuring the relative position for a first object with respect to a second object, comprising:

a scale located on the first object having a periodic graduation in the form of a magnetized pattern;

a scanning unit located on the second object for scanning the graduation located on the first object;

a plurality of magnetoresistive elements disposed on the scanning unit, wherein the elements are exposed to the graduation to generate position-dependent scanning signals wherein the scanning signals are dependent on the instantaneous position of the scale in the measurement direction; and a sensor disposed on the scanning unit, wherein the sensor detects the distance between the scanning unit and the graduation and generates a correction signal dependent upon the distance detected wherein the sensor is formed by the same magnetoresistive elements used to generate the position-dependent scanning signals and the magnetoresistive elements of the sensor are distributed three-dimensionally relative to the scale and are electrically wired together so that a largely unmodulated correction signal appears at the output of the sensor unit.

23. A position measuring device for measuring the relative position of a first object with respect to a second object, comprising:

a scale located on the first object having a periodic graduation in the form of a magnetized pattern;

a scanning unit located on the second object for scanning the graduation located on the first object;

a plurality of magneto-resistive elements disposed on the scanning unit, wherein the elements are exposed to the periodic graduation to generate position-dependent scanning signals wherein the scanning signals are dependent on the instantaneous position of the scale in the measurement direction; and a sensor disposed on the scanning unit, wherein the sensor detects the distance between the scanning unit and the graduation and generates a correction signal dependent upon the distance detected wherein the sensor includes said plurality of magnetoresistive elements, which are placed directly opposite of the periodic graduation and scan this periodic graduation and the correction signal largely unmodulated by the periodic graduation is present at the output of the sensor, wherein the plurality of magneto-resistive elements includes a plurality of magneto-resistive elements connected to form a parallel circuit and the correction signal is taken at the output of the parallel circuit, wherein the magneto-resistive elements for detecting the spacing are disposed within one division period and the plurality of magneto-resistive elements are connected to make a plurality of full bridge circuits connected in parallel wherein the full bridge circuits generate phase-displaced signals and the correction signal is taken at the output of the parallel circuit.

* * * * *

UNITED STATES PATENT AND TRADEMARK OFFICE
CERTIFICATE OF CORRECTION

PATENT NO. : 5,627,466
DATED : May 6, 1997
INVENTOR(S) : Alfons Spies et al.

It is certified that error appears in the above-indentified patent and that said Letters Patent is hereby corrected as shown below:

On the Title Page

In column 1, Item [54], change the title to --POSITION MEASURING DEVICE INCLUDING AN UNMODULATED CORRECTION SIGNAL FOR SPACING COMPENSATION--.

In the Claims

In claim 1, line 18, after "plurality" insert --of--.

In claim 19, line 4, change "scale-on" to --scale on--.

In claim 19, line 13, change "magnetoresistive" to --magneto-resistive--.

Signed and Sealed this

Eleventh Day of April, 2000

Attest:

Q. TODD DICKINSON

Attesting Officer

Director of Patents and Trademarks